Sept. 11, 1951  R. MILLER  2,567,227
PRODUCTION OF CALCIUM PHOSPHATE
Filed Jan. 28, 1948  3 Sheets-Sheet 3

INVENTOR.
Ralph Miller
BY
Raymond J Norton

Patented Sept. 11, 1951

2,567,227

UNITED STATES PATENT OFFICE 2,567,227

PRODUCTION OF CALCIUM PHOSPHATE

Ralph Miller, Woodside, N. Y., assignor to The Chemical Foundation, Incorporated, a corporation of New York Application January 28, 1948, Serial No. 4,887

10 Claims. (Cl. 23—109)

This invention is concerned with the economic production of calcium phosphate and particularly with the economic production of dicalcium phosphate and monocalcium phosphate.

Most of the phosphate fertilizer currently produced consists of monocalcium phosphate $$(CaH_4(PO_4)_2.H_2O)$$

Since phosphate fertilizer is usually produced from phosphate rock whose composition is approximately $7CaO.2P_2O_5$ (disregarding the other elements usually present in phosphate rock) it can be seen that for every mol of phosphate rock which is converted to monocalcium phosphate, 5 mols of CaO must be removed or bound up in a non-objectionable form. In the usual practice the excess calcium is removed as, or bound up in the form of, calcium sulfate. If phosphate rock were converted to dicalcium phosphate rather than to monocalcium phosphate, then but 3 mols of CaO would have to be removed or bound up for every mol of phosphate rock converted to dicalcium phosphate.

The ease of handling phosphatic fertilizer and its $P_2O_5$ concentration are as important as the availability of its phosphorus content to plant life since so much of the cost of phosphate fertilization is made up of transportation, mixing, bagging and application costs. With respect to most of these items, dicalcium phosphate offers advantages over monocalcium phosphate. This is well known to the phosphate fertilizer industry.

The potential advantages of producing dicalcium phosphate rather than monocalcium phosphate have been recognized for many years. In fact, the American Chemical Society Monograph "Phosphoric Acid, Phosphates and Phosphatic Fertilizers" (1927) by Waggaman and Easterwood made this point more than twenty (20) years ago. The subject is discussed in detail on pages 165 and 166. The matter is summed up by these authorities as follows:

"While considerable work has been conducted with a view to reducing the quantity of sulfuric acid necessary in producing citrate soluble phosphoric acid without much success the problem does not appear insurmountable and seems well worthy of further research."

This statement is applicable to the state of the known art to date although a large amount of further research on this problem has been carried out since the publication of the monograph by Waggaman and Easterwood.

A major object of this invention is the production of dicalcium phosphate at an operating cost lower than the cost of producing ordinary superphosphate per unit of $P_2O_5$ made available.

An additional object of this invention is the minimizing of the capital investment required to make the $P_2O_5$ in phosphate rock available to plant life simultaneously with increasing the concentration of $P_2O_5$ in the final product.

A further object of this invention is the production of dicalcium phosphate and monocalcium phosphate substantially free from acid-insoluble constituents using well known chemical engineering unit operations and standard equipment except for being resistant to the corrosive conditions which prevail during some of the steps of the process.

A particular advantage of this invention is that it is operable at temperatures which are nominal for neither extremely high nor markedly low temperatures are required.

An additional major advantage of this invention is that it is adapted to substantially continuous operation although the various steps can be carried out batch-wise if desired. There is no need to store or condition an intermediate product as must now be done in making ordinary superphosphate or concentrated superphosphate.

The substantial achievement of the above objectives and others, incident to the process, to be pointed out below, represent a marked advance in an art which has undergone no major advances in fundamentals for many years.

The process that constitutes this invention possesses the following characteristics:

It may be carried out using sulfuric acid as a reagent which is consumed.

Phosphoric acid or phosphorus pentoxide may be employed along with phosphate rock to produce the desired products.

Solid monocalcium phosphate is produced as an intermediate in the production of dicalcium phosphate.

A substantially non-volatile solvent for monocalcium phosphate is employed cyclically.

The solution of the monocalcium phosphate in the solvent and its separation from the solvent are readily and economically accomplished.

The solvent for monocalcium phosphate aids in the conversion of phosphate rock to monocalcium phosphate.

Phosphoric acid is employed as a cyclic reagent in the production of dicalcium phosphate.

In order to more clearly explain the invention, preferred methods of operation are illustrated in the flow sheet form in the accompanying drawings in which.

The inability of phosphoric acid to convert phosphate rock to solid dicalcium phosphate is well known to the phosphate fertilizer art. This difficulty is overcome in the present invention by converting to monocalcium phosphate that portion of the phosphate rock which is ultimately converted to dicalcium phosphate. While it is preferable to convert all the phosphate rock to monocalcium phosphate, in some instances when sulfuric acid is employed, it is more economical to treat a portion of the rock with sulfuric acid in a manner similar to the way phosphate rock is mixed with sulfuric acid in the standard method of making ordinary superphosphate. This variant in the process will be explained later in detail.

It will simplify the description of the process to disregard the constituents of phosphate rock other than calcium, phosphorus and oxygen and to assume that phosphate rock may be designated as $7CaO.2P_2O_5$. One method of carrying out the process follows. The phosphatic raw material such as phosphate rock is dissolved in a circulating solution composed of phosphoric acid containing some dissolved monocalcium phosphate. The dissolution operation is carried out at an elevated temperature preferably in the neighborhood of 100° C. The temperature at which the dissolution takes place, as will be appreciated, may be varied widely but if the temperature is too low the process is adversely affected as will later become apparent. The ratio of phosphate rock to phosphoric acid and the concentration of phosphoric acid should be adjusted so that a relatively strong solution of phosphoric acid substantially saturated with monocalcium phosphate at the temperature of dissolution is formed. The $P_2O_5$ concentration of the resulting solution should preferably be substantially in excess of 25% and desirably should approximate 40%. Solutions containing higher concentrations of $P_2O_5$, however, can be formed without causing the process to become inoperative.

The solution formed in the dissolution step is preferably separated from any insoluble particles suspended in it. The solution is then cooled to as low a temperature as is economical. As an example, a temperature of approximately 25° C. is suitable when the dissolution temperature is about 100° C., the $P_2O_5$ concentration of the resulting solution is about 40% and the solution is substantially saturated with monocalcium phosphate at the dissolution temperature. The solubility of monocalcium phosphate $$(Ca(H_2PO_4)_2.H_2O)$$

in phosphoric acid solutions increases as the temperature increases. Hence, when the solution saturated with monocalcium phosphate at about 100° C. is cooled, solid monocalcium phosphate crystallizes out of solution. The solid is separated from the cooled solution by settling, filtration or centrifuging or by any convenient combination of these or other applicable liquid-solids separation methods.

The cooled separated solution is then returned to the rock dissolution step of the process.

The solid monocalcium phosphate separated from this cooled solution has an adherent film of the mother liquor from which it was separated. It is desirable that the solid be contaminated with a minimum of free acid. For this reason it is preferable to separate the crystals from the mother liquor by centrifuging. When solid dicalcium phosphate is the desired product, the solid monocalcium phosphate is hydrolyzed with a limited amount of water at an elevated temperature to form solid dicalcium phosphate and a phosphoric acid solution containing that portion of the monocalcium phosphate that is not converted to dicalcium phosphate. The solid dicalcium phosphate is separated from the solution from which it was formed, washed and dried. The separated solution is returned to the cooling step of the process.

Since all the dicalcium phosphate formed in the process is derived from solid monocalcium phosphate, for each mol of product one mol of phosphoric acid must be recycled. The phosphoric acid for recycling in the circuit is formed in the hydrolysis step. Although the extent of the hydrolysis will vary depending upon the conditions prevailing during the hydrolysis step, one mol of phosphoric acid will be formed for each mol of dicalcium phosphate produced. Consequently, the process remains intrinsically in balance regardless of the percentage of conversion that is achieved. When the process is carried out in the described manner all the CaO contained in the phosphate rock introduced directly into the calcium phosphate production cycle ultimately is converted to dicalcium phosphate. This requires that phosphoric acid or its equivalent be introduced into the calcium phosphate production cycle in addition to phosphate rock. There are numerous ways by which this phosphoric acid or its equivalent can be made and introduced into the calcium phosphate production cycle.

Phosphoric acid or its equivalent is made by treating phosphate rock with sulfuric acid by the so-called "wet process" or by the blast furnace or electric furnace process which produces elemental phosphorus as an intermediate. In the one case the excess calcium is removed as calcium sulfate; in the other as a calcium silicate slag. The final product is composed in part of $P_2O_5$ which has been substantially or completely separated from the CaO to which it was bound in the rock before being added to the calcium phosphate production cycle. The following equations represent an idealized version of the reactions in the process when the excess calcium is removed as calcium silicate slag:

(1) $3(CaO \cdot 2P_2O_5) + 30C + 21YSiO_2 = 21(CaO \cdot YSiO_2) + 30CO + 12P$ (2) $12P + 15O_2 + 18H_2O = 12H_3PO_4$ (3) $4(7CaO.2P_2O_5) + 40H_3PO_4 + 24H_2O = 28Ca(H_2PO_4)_2 \cdot H_2O$ (4) $28Ca(H_2PO_4)_2.H_2O = 28CaHPO_4 + 28H_3PO_4 + 28H_2O$ It can be seen (reactions 3 and 4) that for every 4 mols of phosphate rock which are treated and completely converted to dicalcium phosphate, 12 mols of phosphoric acid or its equivalent must be obtained from an additional quantity of phosphate rock. The CaO previously combined with the phosphorus in the phosphoric acid is the excess CaO. The 12 mols of phosphoric acid obtained from the additional quantity of phosphate rock (reactions 1 and 2) is combined with the 28 mols of phosphoric acid formed in the hydrolysis step (reaction 4) to secure the necessary amount of phosphoric acid required in reaction 3 to convert 4 mols of phosphate rock to monocalcium phosphate.

The production of the 12 mols of phosphoric acid as indicated in reactions 1 and 2 may also be made by treatment of phosphate rock with sulfuric acid:

(5) $3(7CaO.2P_2O_5) + 21H_2SO_4 =$
$21CaSO_4 + 12H_3PO_4 + 3H_2O$

Reaction 5 represents the standard "wet process" of making phosphoric acid. As is well known the large scale production of phosphoric acid by the "wet process" is not simple. In addition, it requires an elaborate plant. The final product is relatively dilute compared with the concentration of phosphoric acid produced by thermal methods.

Since the phosphoric acid formed in the hydrolysis step is constantly being recycled and since the solution formed in the hydrolysis step is returned to the crystallization step, 12 mols of phosphoric acid must be added to the circulating solution for every 4 mols of phosphate rock that dissolves completely. When the process is being carried out in this manner, the 12 mols of phosphoric acid may be added at any convenient part of the cycle just as long as solid monocalcium phosphate crystallizes out in the cooling step of the process.

The foregoing procedure is one that can be employed when for any reason it is found desirable to treat one part of the phosphate rock to produce phosphoric acid or its equivalent and to employ the phosphoric acid so made in the calcium phosphate production cycle. The phosphoric acid, as noted previously, may be made by thermal processes or by the "wet process." This method of procedure requires the substantial total dissolution of the phosphate rock in a phosphoric acid solution. This can be achieved in most instances even if the phosphate rock tends to be refractory. If sulfuric acid is employed to remove the excess calcium, it is not necessary to produce phosphoric acid as such by the "wet process." Instead it is preferable to modify the process. In the modified process the excess calcium is removed within the calcium phosphate production cycle. The modified process may be represented by the following reactions:

(6) $6H_2O + 7CaO.2P_2O_5 + 10H_3PO_4 =$
$7Ca(H_2PO_4)_2.H_2O$ (7) $4Ca(H_2PO_4)_2.H_2O =$
$4CaHPO_4 + 4H_3PO_4 + 4H_2O$ (8) $3Ca(H_2PO_4)_2.H_2O + 3H_2SO_4 =$
$3CaSO_4 + 6H_3PO_4 + 3H_2O$

Reaction 6 represents the treatment of one mol of phosphate rock with 10 mols of phosphoric acid to form the equivalent of 7 mols of monocalcium phosphate. Reaction 7 represents the hydrolysis of 4 mols of solid monocalcium phosphate to form 4 mols of product and 4 mols of phosphoric acid. The 4 mols of phosphoric acid are recycled to the phosphate rock dissolution step of the process. For every 4 mols of solid monocalcium phosphate hydrolyzed to dicalcium phosphate, 3 mols of dissolved calcium, which conveniently may be represented as dissolved monocalcium phosphate, is precipitated with 3 mols of sulfuric acid to form solid calcium sulfate and 6 mols of phosphoric acid. Reaction 8 represents the conversion of the excess calcium present as dissolved calcium phosphate to solid calcium sulfate. The solid calcium sulfate is readily removed from the system by filtration or its equivalent. The phosphoric acid formed concomitantly with the formation of the solid calcium sulfate is then used in the rock dissolution step of the process to dissolve the excess CaO contained in the succeeding quantity of phosphate rock that is dissolved. As in the previous process, the phosphate rock is dissolved at relatively elevated temperatures, i. e. in the neighborhood of 100° C. and the solution leaving the dissolution step is relatively strong phosphoric acid substantially saturated with monocalcium phosphate at the elevated temperature. The hot, saturated solution is cooled to crystallize out solid monocalcium phosphate. The solid monocalcium phosphate is separated from its mother liquor. This solid monocalcium phosphate is then hydrolyzed to dicalcium phosphate and a phosphoric acid solution saturated with monocalcium phosphate. The latter is returned to the cooling step of the process. The cool, separated mother liquor containing the excess CaO originally part of the rock is mixed with sulfuric acid to form a slurry composed of solid calcium sulfate and a phosphoric acid solution containing some dissolved CaO. The solid calcium sulfate, as mentioned previously, is separated from the solution from which it was formed. The solution fortified with the additional phosphoric acid produced as a result of the formation of the solid calcium sulfate is recycled to the rock dissolution step of the process after being warmed. This is the preferred method of carrying out the process.

Another way in which the process may be modified using sulfuric acid to remove the excess calcium is useful when particularly refractory phosphate rock is employed. The process is carried out in a manner essentially similar to the procedure described above. If the phosphate rock is refractory, it will be difficult to dissolve all of its $P_2O_5$ content completely in phosphoric acid. To recover the difficulty soluble $P_2O_5$ content of the rock the refractory portion is treated directly with sulfuric acid using sufficient acid to convert all the $P_2O_5$ content to a form that is soluble in phosphoric acid. The treatment of the refractory portion of the rock with sulfuric acid constitutes only a simple mixing operation. It can be carried out in about the same way that ordinary superphosphate is made. This produces a mixture composed principally of calcium sulfate and monocalcium phosphate. The resulting mixture is then leached with the circulating solvent solution at any convenient part of the cycle. The $P_2O_5$ content of the mixture dissolves in the circulating solution while the calcium sulfate does not. Obviously, any part of the sulfuric acid used to treat the refractory portion of the rock is deducted from the acid employed to remove excess calcium from the circulating solution, since the calcium content of the refractory portion of the rock converted to calcium sulfate by direct treatment with sulfuric acid never enters the circulating solution. All the data that have been obtained on the amenability of phosphate rock to dissolution in phosphoric acid solutions under the conditions employed in this process indicate that in excess of 70% of the rock will dissolve without difficulty and that the CaO and $P_2O_5$ go into solution in about the same ratio in which they are present in the rock. Hence there is ample sulfuric acid to convert all the $P_2O_5$ in the undissolved portion of the rock to a form soluble in phosphoric acid.

From the foregoing, the essential concepts embodied in the novel process will be appreciated. It can be seen that the non-volatile solvent for monocalcium phosphate is a strong phosphoric acid solution. The solution of the monocalcium phosphate in strong phosphoric acid takes place at a high temperature point of the cycle and the separation of the monocalcium phosphate takes place at the low temperature point of the cycle. Since the solute is very soluble in the solvent at elevated temperatures and is but moderately soluble at the low temperature point of the cycle, the amount of solute which may be transferred per unit of solvent circulated is relatively high. For example, 100 pounds of a 48% phosphoric acid solution can dissolve in excess of 33 pounds of monocalcium phosphate at 100° C. At 25° C., the same quantity of 48% phosphoric acid solution can dissolve about 15 pounds of monocalcium phosphate. Thus about 18 pounds of monocalcium phosphate can be separated per 115 pounds of solution circulated. This is a very favorable ratio of material transferred per pound of solution circulated. It is apparent that the process can be so operated that the heat required to warm the solution up to the dissolution temperature from the crystallization temperature is the principal heat burden of the process.

It is well known that among other factors the conversion of phosphate rock to monocalcium phosphate by reaction with phosphoric acid varies with the concentration of the acid employed and the ratio of $P_2O_5$ to $CaO$ in the mixture and that the most important variable is the $P_2O_5$ to $CaO$ ratio. Since in the present process the solvent for the monocalcium phosphate which is formed is phosphoric acid, the $P_2O_5$ to $CaO$ ratio is very much higher than in any other process now employed. Fortuitously, then, phosphoric acid possesses not only useful solvent properties for monocalcium phosphate but it also is particularly helpful in the formation of monocalcium phosphate. The role of phosphoric acid as a cyclic reagent is to aid in the conversion of the phosphate rock to monocalcium phosphate. If phosphoric acid was not employed as a cyclic reagent in the manner described, then the process would become inoperative since the conditions by which it is possible to convert phosphate rock to dicalcium phosphate employing the stoichiometric quantity of phosphoric acid are not known to date, and may be non-existent. The phosphoric acid is recovered for recycling by the hydrolysis step of the process.

Figure 1:
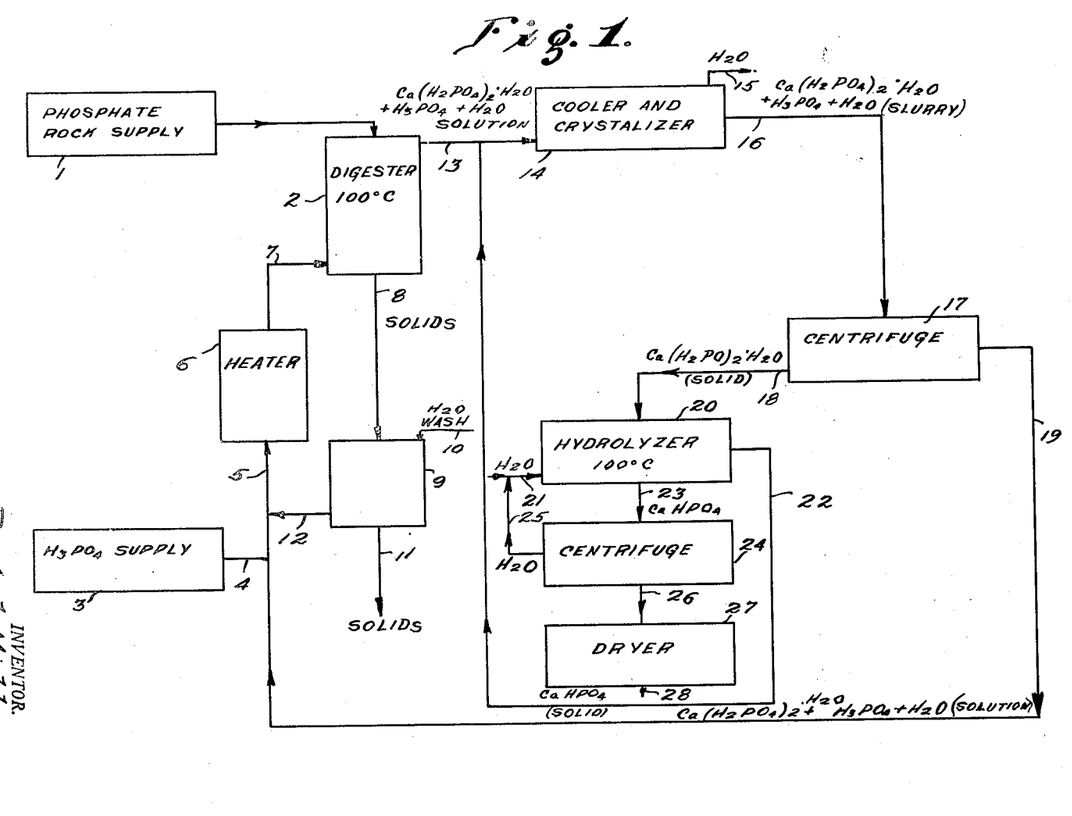
Fig. 1 is a flow sheet illustrating the novel operation utilizing an extraneous source of phosphoric acid.

Figure 1 illustrates diagrammatically one method in which the process may be carried out when an extraneous source of phosphoric acid is used. This is an idealized version of the process. When the process is carried out in practice, minor but important steps are added. These steps will be mentioned in the description that follows.

As shown in Fig. 1, phosphate rock is transported from a source of supply 1 to the digester 2. If desired, the rock may be ground prior to discharge into the digester although in the present process this is not necessary. It will thus be noted that this constitutes a real advantage in that it eliminates grinding costs. In accordance with the principles of the invention, as previously explained the rock is contacted in the digester with a special solution. This comprises a phosphoric acid solution of about 50% concentration, more or less, which contains sufficient dissolved monocalcium phosphate to be less than half saturated at 100° C. The initial make up of phosphoric acid plus any necessary replacement supply is drawn from the acid storage 3 and is passed through line 4 into line 5 which constitutes a portion of the continuous circuit or cycle utilized in the invention. The solution in line 5 which, as noted, is a strong phosphoric acid solution containing some dissolved monocalcium phosphate, is heated in a suitable heating unit 6 up to the desired temperature which preferably is substantially 100° C. and discharged into the digester through line 7. As shown in the digester the rock passes countercurrently to the acid. The conditions thus established in the digester favor a rapid reaction of the acid with the rock. While the acid does contain some dissolved monocalcium phosphate it is not saturated and the acid employed is a strong acid. Under the conditions of the operation the temperature is high and there is a large excess of phosphoric acid over that required to convert all of the rock to monocalcium phosphate. As is known, the extent of the reaction between the rock and acid depends upon the ratio of $P_2O_5$ to $CaO$ and upon the concentration of the acid. The ratio of $P_2O_5$ to $CaO$ employed in the present process is larger than in any process now employed. The concentration of acid is sufficiently high so that it readily reacts with the rock. As is known the reaction between the acid and rock is exothermic and hence there is no difficulty in keeping the solution at a sufficiently elevated temperature to insure rapid reaction with the rock.

The digester 2 may be of any suitable type of construction provided with an acid resistant lining. For example, this reaction stage may comprise one or more digesters lined with carbon brick.

The hot phosphoric acid solution now substantially saturated with monocalcium phosphate flows from the upper section of the digester and is treated in a manner to be described to remove a quantity of the contained monocalcium phosphate and the acid solution containing some dissolved monocalcium phosphate is recycled.

In the digester the acid insoluble constituents of the rock are not dissolved by the acid solution. These accumulate in the bottom section of the digester and are removed at convenient periods through the solids discharge line 8. The discharged solids are washed in the washer 9 with hot water entering line 10 to recover the adherent acid solution. The solids are discharged from the system through line 11. The wash liquor passes through line 12 and is added to the recycle solution in line 5.

The hot saturated solution of phosphoric acid is withdrawn from the digester through line 13 and is passed to a stage 14 wherein it is cooled to an extent sufficient to crystallize a substantial portion of the dissolved monocalcium phosphate. Whenever required or whenever deemed desirable the solution passing through line 13 may be filtered, centrifuged or otherwise treated to remove suspended or entrained solids before discharge to the cooling stage.

The crystallizing stage may be of any desired type. Preferably this comprises a unit, such as a vacuum crystallizer, in which water vapor may be removed, as through line 15, to increase the concentration concomitantly with cooling.

In this manner, part or all of the water introduced into the circuit or system is removed advantageously utilizing the specific heat of the hot effluent from the digester.

The cooled slurry formed in the crystallizer 14 flows through line 16 to a suitable liquid-solids separation stage such for example as the centrifuge 17. The solids separated in the centrifuge consisting essentially of monocalcium phospate are discharged through line 18 and the acid liquor through line 19. The discharged solids may be segregated and stored for any subsequent treatment or disposition. In the preferred method of producing dicalcium phosphate such solids are passed directly to a hydrolyzer 20 wherein a portion of the monocalcium salt is converted to dicalcium phosphate and a phosphoric acid solution. The water utilized for hydrolysis may conveniently be introduced into the hydrolyzer through line 21. Since the extent of hydrolysis increases with increasing temperature it is preferable to effect such hydrolysis at as high a temperature as is feasible. The hydrolysis can be carried out at about 100° C. without undue difficulty. By operating the hydrolyzer under pressure more elevated temperatures may be employed with concomitant reduction in the amount of water required per pound of dicalcium phosphate formed. The unconverted monocalcium phosphate in solution in phosphoric acid is discharged through line 22 and passes back to line 3 for discharge into the crystallization stage.

The solid dicalcium phosphate formed in the hydrolyzer is passed through line 23 to a separation stage such as the centrifuge 24. The aqueous effluent from the centrifuge passes through line 25 back to the hydrolyzer. The solid dicalcium phosphate leaves the centrifuge through conduit 26 and is discharged into the dryer 27. The dried product is withdrawn at 28 to storage or shipment.

Referring to the centrifuge 17 it will be seen that the solution of monocalcium phosphate in phosphoric acid passes through line 19 for reemployment in the system. This solution is heated in the heating stage and is fed to the digester. As is shown, in transit to the digester the recycle solution is fortified by admixture with wash liquor from washer 9 and any necessary replenishment from phosphoric acid supply 3.

Figure 2:
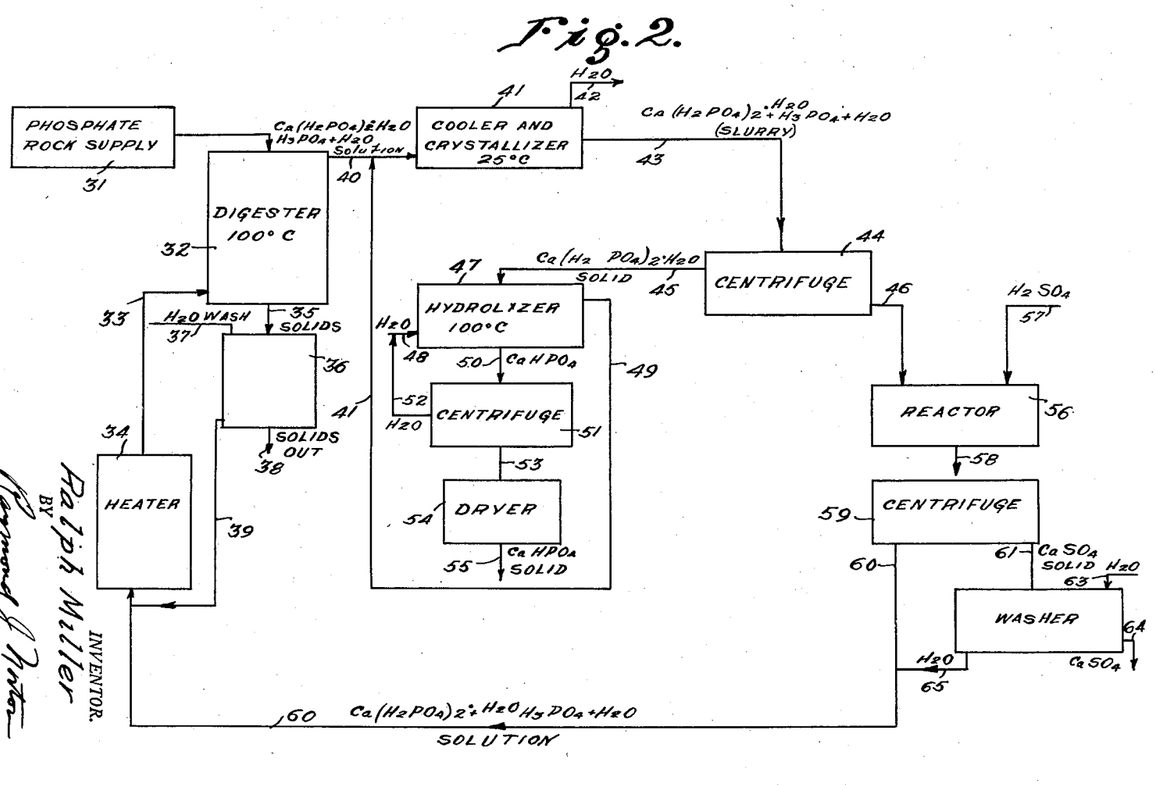
Fig. 2 is a flow sheet illustrating the modified method in which sulfuric acid is utilized to remove excess calcium.

Figure 2 illustrates how the process may be carried out when sulfuric acid is employed to remove the excess calcium in the rock instead of employing an extraneous source of phosphoric acid. The details of the process are essentially similar to those set forth in the process depicted in Fig. 1 except for the precipitation of the excess calcium as calcium sulfate by means of sulfuric acid.

As shown in Fig. 2, phosphate rock from supply 31 is charged to the digester 32 and as described is contacted there with a hot phosphoric acid solution containing some monocalcium phosphate introduced through line 33 which has been heated in heater 34. The insoluble material accumulating in the digester is passed through line 35 for washing in washer 36 by means of wash water introduced through line 37. The washed solids are discarded through line 38 and the wash liquor is introduced into the acid recycle circuit through line 39.

As in the process of Fig. 1 the hot effluent acid liquor passes from the digester through line 40 to the crystallizing stage 41 from which water may be removed as vapor through line 42. The slurry formed in the crystallizer passes through line 43 to the centrifuge 44 for separation of the solid and liquid constituents. The separated solids are passed through line 45 and the liquid effluent through line 46. The solids are discharged into the hydrolyzer 47 and are hydrolyzed in the manner described by water introduced through line 48. The acid liquor from the hydrolyzer passes by way of line 49 back to the crystallization stage. The wet solids are discharged through line 50 to the centrifuge 51 in which they are dewatered. The liquid from the centrifuge is recycled to the hydrolyzer through line 52 while the dewatered solids are passed through line 53 into the dryer 54 and are discharged after being dried through line 55.

The acid solution separated in the centrifuge 44 is treated to remove the excess calcium which tends to build up in the circuit. As shown, this solution is passed through line 46 to reactor 56 wherein it is contacted with sulfuric acid admitted through line 57 to precipitate the excess calcium as solid calcium sulphate. The resulting slurry is discharged through line 58 to the centrifuge 59. The separated acid liquor is recycled to the digestion stage through line 60 as shown. The wet solid calcium sulfate is discharged from the centrifuge through line 61 and is washed in the unit 62 by water admitted through line 63. The washed solids are discharged through line 64 while the acid enriched wash liquor is introduced into the recycle circuit through line 65.

Figure 3:
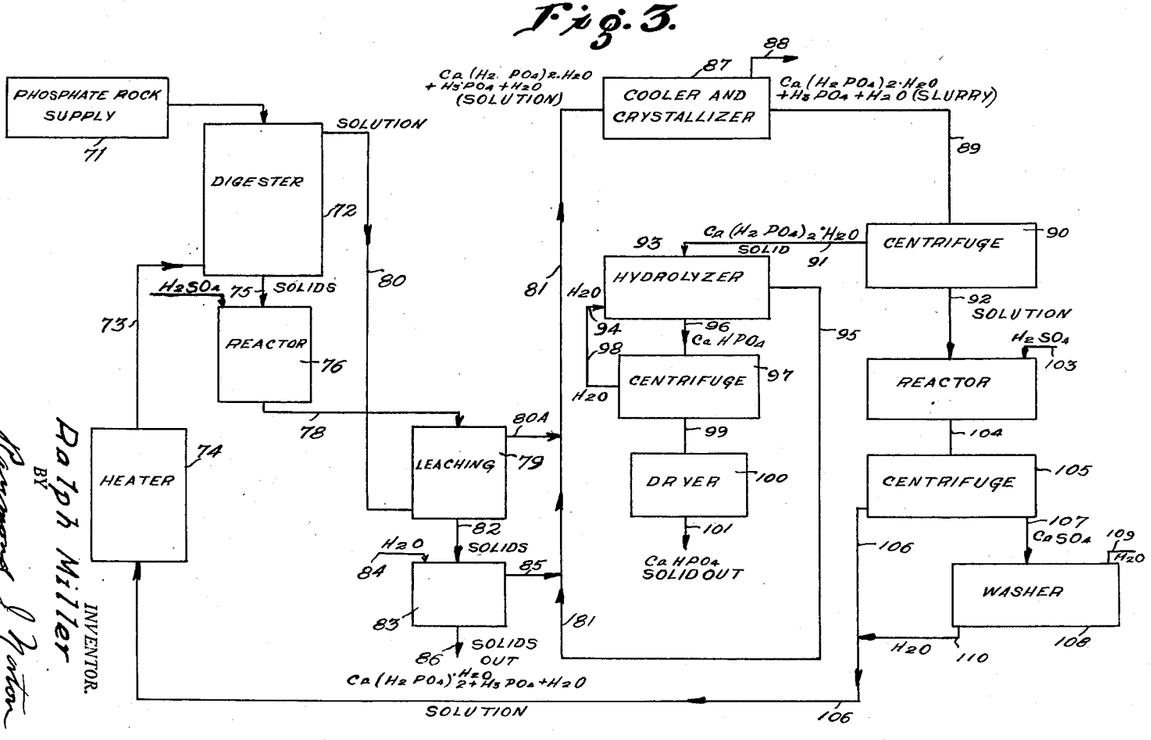
Fig. 3 is a flow sheet of a preferred method of operation utilizing refractory phosphate rock as the source material.

In Fig. 3 there is illustrated a preferred modification of the process wherein the phosphate rock employed is particularly refractory. It will be observed from an inspection of the flow sheet that it is essentially similar to that shown in Fig. 2, with the additional showing that the solids from the digester, containing recoverable phosphate values are treated with sulphuric acid to produce phosphate compounds soluble in phosphoric acid.

The general circuit flow of materials through the system is as has been previously described. Rock from storage 71 passes to digester 72 and is reacted with the phosphoric acid solution entering line 73 and which has previously been heated in heater 74.

The solids accumulating in the bottom of the digester are passed through line 75 and are reacted in reactor 76 with sulphuric acid admitted through line 77. The reaction products from reactor 76 are passed through line 78 to a leaching vessel 79 wherein the solids are leached with the hot effluent acid solution from the digester admitted through line 80. The enriched phosphoric acid solution passes through line 81 and is then treated in the same manner as has been previously described with respect to the solution discharged through line 48 of Fig. 2.

The leached solids are discharged from the leaching vessel 79 through the line 82 to the washer 83 and are washed with water admitted through line 84. The wash liquor is discharged through line 85 into line 81 and passes as described to the crystallization stage.

As noted above, the acid liquor flowing through line 81 is treated in exactly the same manner as the equivalent liquor charged through line 40 of Fig. 2. This liquor passes to crystallizer 87 from which water in the form of steam may be evolved and discharged through line 88. The slurry formed in the crystallizer is passed through line 89 to the centrifuge 90. The wet solid monocalcium phosphate is discharged through line 91 and the solution through line 92. The monocalcium phosphate is admitted to hydrolyzer 93 wherein it is hydrolyzed with water admitted through line 94. The liquid from hydrolyzer 93 comprised of a solution of phosphoric acid containing some monocalcium phosphate enters line 81 and is passed to the crystallizer 87. The dicalcium phosphate formed in the hydrolyzer passes through line 96 and is dewatered in the centrifuge 97. The water separated in the centrifuge is recycled through line 98 to the hydrolyzer. The dewatered phosphate passes through line 99 and is dried in dryer 100 from which it is discharged through line 101 to storage or for transportation.

The production of monocalcium phosphate, as indicated, is also included within the scope of this invention. When monocalcium phosphate is produced, the consumption of sulfuric acid is increased since more calcium must be removed than when dicalcium phosphate is produced. If an extraneous source of phosphoric acid is employed, then the amount of phosphoric acid required per mol of phosphate rock employed in the monocalcium phosphate production cycle is increased. The hydrolysis step in the dicalcium phosphate process can be eliminated provided the phosphoric acid coating the monocalcium phosphate crystal is not seriously objectionable. If the phosphoric acid coating the crystals is objectionable, it is necessary to eliminate it. It is not possible to remove the excess phosphoric acid from the crystals by washing them with water. To produce monocalcium phosphate free from excess phosphoric acid and free from acid insoluble constituents, a portion of the monocalcium crystals is hydrolyzed with water as in the dicalcium phosphate process to form solid dicalcium phosphate and a solution of phosphoric acid containing some dissolved calcium phosphate. The solid dicalcium phosphate is then intimately mixed with the monocalcium phosphate crystals containing excess phosphoric acid. The proportion of dicalcium phosphate to monocalcium phosphate is adjusted so that a mol of dicalcium phosphate is added for each mol of free phosphoric acid adhering to the monocalcium phosphate crystals. The free phosphoric acid reacts with the solid dicalcium phosphate to form monocalcium phosphate. A small excess of dicalcium phosphate can be used to improve the handling properties of the mixture. Any excess water can be removed by drying. In this way it is possible to produce a product whose composition can be varied at will.

Relatively pure phosphoric acid, monocalcium phosphate and dicalcium phosphate can be made economically by integrating the production of these products along with the production of fertilizer grade calcium phosphate. Practically all phosphate rock contains appreciable quantities of combined fluorine, iron and aluminum as well as silica. The dissolution of phosphate rock in phosphoric acid causes significant amounts of these impurities to dissolve along with the lime and $P_2O_5$. As the solvent solution is recycled, these impurities tend to build up in the circulating solution. That portion of the iron and aluminum in the rock which is converted to the phosphate leaves the system along with the acid-insoluble constituents of the rock and in the final product. Fluorine that dissolves is vaporized in the rock dissolution step, the rewarming step and in the vacuum crystallizer; the remainder leaves the system along with the calcium phosphate.

Pure phosphoric acid is made by acidulating pure calcium phosphate either the mono or the di with an equivalent amount of pure sulfuric acid. Solid calcium sulfate is precipitated and phosphoric acid containing only minor amounts of dissolved calcium and sulfate is formed. The solid calcium sulfate is separated from the pure phosphoric acid. The pure crystalline calcium phosphate is produced by recrystallization from phosphoric acid solutions. The impure acid plus its calcium phosphate content which results from the recrystallization operations are added to the fertilizer calcium phosphate production cycle. In this way there are no losses resulting from values contained in solutions which otherwise might have to be discarded.

Since, as has been explained, it is essential that solid monocalcium phosphate crystallize from the circulation solution at the lowest temperature to which the circulation solution is reduced, the phosphoric acid concentration of the circulation solution must be sufficiently high so that the solid phase in equilibrium with it at the reduced temperature is monocalcium phosphate. Therefore, the minimum phosphoric acid concentration of the circulation solution employed in this process depends upon the lowest temperature to which the circulation solution is reduced. The expression "strong phosphoric acid" as used in this specification and claims means a phosphoric acid solution that is in equilibrium with solid monocalcium phosphate at the lowest temperature to which the circulation solution is subjected.

From the foregoing description it will be appreciated that the novel concepts of the invention may be embodied in a number of specifically different processes, all of which are as eminently simple as they are technically effective. These several modifications have been described to illustrate the wide permissive variation in operative technique to adapt the novel process to different types of raw material and to obtain specifically different valuable end products. In all such described and equivalent modifications the fundamental inventive concepts are invoked, namely, the establishment of a circulation fluid, or recycle solvent, comprised of strong phosphoric acid having some dissolved monocalcium phosphate; flowing this in a closed cycle or circuit; enriching the solution in calcium phosphate in some chosen section of the cycle; removing phosphatic values in another section of the circuit by the simple expedient of reducing the temperature, preferably coupled with the simple conversion of such phosphatic values to a more desirable product with concomitant regeneration of the necessary cyclic reagent required to convert the phosphatic source material to a form soluble in the circulation fluid. As explained previously the excess calcium which tends to build up in the system must be removed. This may be done, as pointed out, either by removing the calcium as an insoluble, readily separable salt, or by introducing phosphoric acid in the circulation liquid. In either event the circulation fluid provides a most amenable vehicle for such treatments.

I claim:

1. A method of producing dicalcium phosphate which comprises establishing a solution of strong phosphoric acid containing some dissolved monocalcium phosphate, flowing such solution in a closed circuit; contacting the solution at an elevated temperature with phosphate rock in one section of the circuit under conditions controlled to dissolve the rock to thereby increase the amount of monocalcium phosphate dissolved in the solution; flowing the monocalcium phosphate-enriched solution to another section of the circuit and there reducing the temperature sufficiently to crystallize a portion of the dissolved monocalcium phosphate, separating the solid monocalcium phosphate from the solution, hydrolyzing the separated solid monocalcium phosphate to dicalcium phosphate and phosphoric acid and further contacting the monocalcium phosphate-depleted solution with phosphate rock in the circuit and introducing the phosphoric acid produced in the hydrolyzing step into the said circuit.

2. A method of producing dicalcium phosphate which comprises establishing a solution of strong phosphoric acid containing some dissolved monocalcium phosphate; flowing such solution in a closed circuit, contacting the solution at an elevated temperature with phosphate rock in one section of the circuit under conditions controlled to dissolve the rock to thereby increase the amount of monocalcium phosphate dissolved in the solution, flowing the said hot, enriched solution to another section of the circuit and there reducing the temperature sufficiently to crystallize a portion of the dissolved monocalcium phosphate, separating the solid monocalcium phosphate from the monocalcium phosphate-depleted solution, hydrolyzing the separated solid monocalcium phosphate with water to form solid dicalcium phosphate and a solution of phosphoric acid containing some dissolved monocalcium phosphate, separating the solid dicalcium phosphate from its associated solution and further contacting the last said solution and the monocalcium phosphate-depleted solution with phosphate rock in the circuit.

3. The process of claim 2 in which the phosphate rock is contacted with the strong phosphoric acid solution containing some dissolved monocalcium phosphate at a temperature between about 75° C. and 125° C.

4. A method of producing dicalcium phosphate which comprises, establishing a solution of strong phosphoric acid containing some dissolved monocalcium phosphate, flowing such solution in a closed circuit; contacting the solution at an elevated temperature with phosphate rock in one section of the circuit under conditions controlled to dissolve the rock to thereby increase the amount of monocalcium phosphate dissolved in the solution; flowing such enriched solution to another section of the circuit and there reducing the temperature sufficiently to crystallize a portion of the dissolved monocalcium phosphate, separating the solid monocalcium phosphate from the monocalcium phosphate-depleted solution; hydrolyzing the separated solid monocalcium phosphate with water to form solid dicalcium and a solution of phosphoric acid containing some dissolved monocalcium phosphate, further contacting the last said solution and the monocalcium phosphate-depleted solution with phosphate rock in the circuit and introducing additional amounts of phosphoric acid in the circuit.

5. The process of claim 4 in which the phosphate rock is contacted with the strong phosphoric acid solution containing some dissolved monocalcium phosphate at a temperature between about 75° C. and 125° C.

6. A method of producing dicalcium phosphate which comprises establishing a solution of strong phosphoric acid containing some dissolved monocalcium phosphate, flowing such solution in a closed circuit; contacting the solution at an elevated temperature with phosphate rock in one section of the circuit under conditions controlled to dissolve the rock to thereby increase the amount of monocalcium phosphate dissolved in the solution; flowing the monocalcium phosphate-enriched solution to another section of the circuit and there reducing the temperature sufficiently to crystallize a portion of the dissolved monocalcium phosphate, separating the solid monocalcium phosphate from the monocalcium phosphate-depleted solution, hydrolyzing the separated solid monocalcium phosphate to dicalcium phosphate and phosphoric acid, introducing the phosphoric acid produced in the hydrolyzing step into said circuit, adding to the monocalcium phosphate-depleted solution an amount of sulfuric acid substantially equivalent to the difference between the CaO content of the dissolved portion of the rock and the CaO content of the solid dicalcium phosphate formed to thereby form solid calcium sulfate and phosphoric acid, separating the calcium sulfate from the resulting solution and further contacting such solution with phosphate rock in the circuit.

7. A process in accordance with claim 6 in which the separated solid calcium sulfate is washed with water and the wash liquor is added to said resulting solution.

8. A method of producing dicalcium phosphate which comprises establishing a solution of strong phosphoric acid containing some dissolved monocalcium phosphate; flowing such solution in a closed circuit, contacting the solution at an elevated temperature with phosphate rock in one section of the circuit under conditions controlled to dissolve the rock to thereby increase the amount of monocalcium phosphate dissolved in the solution, flowing the said hot, enriched solution to another section of the circuit and there reducing the temperature sufficiently to crystallize a portion of the dissolved monocalcium phosphate, separating the solid monocalcium phosphate from the monocalcium phosphate-depleted solution, hydrolyzing the separated solid monocalcium phosphate with water to form solid dicalcium phosphate and a phosphoric acid solution containing some dissolved monocalcium phosphate, separating the solid dicalcium phosphate from the phosphoric acid solution containing some dissolved monocalcium phosphate, recycling the last said solution to the crystallization step of the process, adding an amount of sulfuric acid to the monocalcium phosphate-depleted solution substantially equivalent to the difference between the CaO content of the dissolved rock and the CaO content of the solid dicalcium phosphate formed in the hydrolysis step to form solid calcium sulfate and phosphoric acid in situ in the monocalcium phosphate-depleted solution, separating the solid calcium sulfate from the associated solution and further contacting the said separated associated solution with phosphate rock in the circuit.

9. A method of producing dicalcium phosphate which comprises establishing a solution of strong phosphoric acid containing some dissolved monocalcium phosphate, flowing such solution in a closed circuit, contacting the solution at an elevated temperature with phosphate rock in one section of the circuit under conditions controlled to dissolve a portion of the rock to thereby increase the amount of monocalcium phosphate dissolved in the phosphoric acid solution; separating the thus enriched phosphoric acid solution from the undissolved portion of the rock, then intimately mixing the undissolved portion of the rock with sufficient sulfuric acid to form solid calcium sulfate and to convert the residual $P_2O_5$ content of the rock to a phosphate compound soluble in a phosphoric acid-containing solution, contacting the reaction mixture with a phosphoric acid-containing solution to thereby dissolve the phosphoric acid-soluble components of the mixture, introducing the resulting solution into the circuit; flowing the phosphoric acid solution enriched with monocalcium phosphate resulting from the phosphate rock contacting step to another section of the circuit and there reducing the temperature of the solution sufficiently to crystallize a portion of the dissolved monocalcium phosphate, separating the solid monocalcium phosphate from the monocalcium phosphate-depleted solution; hydrolyzing the separated solid monocalcium phosphate with water to form solid dicalcium phosphate and a phosphoric acid solution containing dissolved monocalcium phosphate, separating the solid dicalcium phosphate from its associated solution; recycling the separated phosphoric acid solution containing dissolved monocalcium phosphate to the crystallization step of the process and further contacting the monocalcium phosphate-depleted solution with phosphate rock in the circuit.

10. The process of claim 9 in which sulfuric acid is added to the monocalcium phosphate-depleted solution to form solid calcium sulfate and phosphoric acid in situ in the monocalcium phosphate-depleted solution and separating the solid calcium sulfate from the solution with which it was associated, the amount of sulfuric acid being determined by subtracting from an amount of sulfuric acid equivalent to the CaO in the rock which dissolves in the circulating solution the total of an amount of sulfuric acid equivalent to the CaO contained in the solid dicalcium phosphate product plus the sulfuric acid intimately mixed with the undissolved portion of the rock.

RALPH MILLER.

REFERENCES CITED

The following references are of record in the file of this patent:

UNITED STATES PATENTS

| Number | Name | Date |
|---|---|---|
| 1,459,124 | Webster | June 19, 1923 |
| 2,021,527 | Suchy et al. | Nov. 19, 1935 |
| 2,057,956 | Kaselitz | Oct. 20, 1936 |
| 2,343,456 | Henninger | Mar. 7, 1944 |

OTHER REFERENCES

Elmore et al., Industrial & Engineering Chemistry, vol. 32, No. 4 (1940), pages 580-6.